(12) United States Patent
Okino (10) Patent No.: US 11,848,033 B2
(45) Date of Patent: Dec. 19, 2023

(54) INFORMATION PROCESSING DEVICE AND FILE RECORDING METHOD

(71) Applicant: SONY INTERACTIVE ENTERTAINMENT INC., Tokyo (JP)

(72) Inventor: Naoto Okino, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 47 days.

(21) Appl. No.: 17/768,140

(22) PCT Filed: Sep. 28, 2020

(86) PCT No.: PCT/JP2020/036713
§ 371 (c)(1),
(2) Date: Apr. 11, 2022

(87) PCT Pub. No.: WO2021/095377
PCT Pub. Date: May 20, 2021

(65) Prior Publication Data
US 2023/0062039 A1 Mar. 2, 2023

(30) Foreign Application Priority Data
Nov. 14, 2019 (JP) ................. 2019-206302

(51) Int. Cl.
*G11B 27/28* (2006.01)
(52) U.S. Cl.
CPC ................. *G11B 27/28* (2013.01)
(58) Field of Classification Search
None
See application file for complete search history.

(56) References Cited

U.S. PATENT DOCUMENTS 5,675,785 A * 10/1997 Hall ............... G06F 16/283
707/999.102
7,825,961 B2 * 11/2010 Koba ............... G11B 27/11
348/374

(Continued)

FOREIGN PATENT DOCUMENTS

JP 2005-339725 A 12/2005
JP 2007-79774 A 3/2007
(Continued)

OTHER PUBLICATIONS

International Search Report and Written Opinion dated Nov. 24, 2020, from PCT/JP2020/036713, 9 sheets.
(Continued)

*Primary Examiner* — Peter Vincent Agustin
(74) *Attorney, Agent, or Firm* — XSENSUS LLP (57) ABSTRACT

A file system 130 has a function of integrally managing a first recording region 9a in a first auxiliary storage device and a second recording region 9b in a second auxiliary storage device. A reception section 110 receives information indicating the type of the file to be recorded. A place information acquisition section 114 acquires information regarding a recording place corresponding to the received information indicating the type of the file. A metadata processing section 134 defines metadata regarding a recording place of the file in reference to the acquired information regarding the recording place. A recording processing section 132 records the file into the first recording region 9a and/or the second recording region 9b according to the defined metadata.

20 Claims, 6 Drawing Sheets

(56) References Cited

U.S. PATENT DOCUMENTS

| | | | | |
|---|---|---|---|---|
| 7,849,282 | B2* | 12/2010 | Nonaka | G06F 3/0643 711/165 |
| 10,166,467 | B2* | 1/2019 | Okino | A63F 13/35 |
| 2005/0234858 | A1* | 10/2005 | Torii | G11B 27/034 |
| 2006/0092785 | A1* | 5/2006 | Takashima | G11B 27/329 369/47.1 |
| 2007/0061539 | A1* | 3/2007 | Nonaka | G06F 3/0685 711/170 |
| 2009/0047002 | A1* | 2/2009 | Morimoto | G11B 27/329 386/335 |
| 2009/0132621 | A1* | 5/2009 | Jensen | G06F 3/0673 |
| 2010/0316349 | A1* | 12/2010 | Nagano | G11B 27/105 386/230 |
| 2015/0126283 | A1* | 5/2015 | Okino | A63F 13/71 463/42 |
| 2015/0126288 | A1* | 5/2015 | Okino | G11B 20/10527 463/43 |
| 2016/0105632 | A1* | 4/2016 | Endo | H04N 5/772 386/225 |
| 2023/0062039 | A1* | 3/2023 | Okino | G06F 16/906 |

FOREIGN PATENT DOCUMENTS

| | | |
|---|---|---|
| JP | 2011-513805 A | 4/2011 |
| JP | 2015088144 A | 5/2015 |
| JP | 2015088146 A | 5/2015 |
| JP | 2019028778 A | 2/2019 |

OTHER PUBLICATIONS

Office Action dated Apr. 25, 2023, from Japanese Patent Application No. 2019-206302, 4 sheets.

* cited by examiner

| FILE TYPE AND/OR INSTRUCTION FOR FILE | FIRST DATA | SECOND DATA |
|---|---|---|
| INSTALL SECOND GAME FILE | EITHER REGION | PRIORITY TO SECOND RECORDING REGION |
| START SECOND GAME FILE | EITHER REGION | PRIORITY TO SECOND RECORDING REGION |
| TERMINATE EXECUTION OF SECOND GAME FILE | EITHER REGION | PRIORITY TO SECOND RECORDING REGION |
| INSTALL FIRST GAME FILE | EITHER REGION | PRIORITY TO FIRST RECORDING REGION |
| START FIRST GAME FILE | EXCLUSIVELY TO FIRST RECORDING REGION | PRIORITY TO FIRST RECORDING REGION |
| TERMINATE EXECUTION OF FIRST GAME FILE | EITHER REGION | PRIORITY TO FIRST RECORDING REGION |
| VIDEO FILE | EITHER REGION | PRIORITY TO SECOND RECORDING REGION |
| SYSTEM FILE | EXCLUSIVELY TO FIRST RECORDING REGION | PRIORITY TO FIRST RECORDING REGION |
| TEMPORARY FILE | EITHER REGION | FILE SYSTEM'S CHOICE |
| ... | ... | ... |

(a) METADATA INDICATES "EXCLUSIVELY TO FIRST RECORDING REGION"

(b) METADATA INDICATES "EITHER REGION"

INFORMATION PROCESSING DEVICE AND FILE RECORDING METHOD

TECHNICAL FIELD

The present invention relates to a technology of recording files in a plurality of auxiliary storage devices.

BACKGROUND ART

Game software has conventionally been distributed and sold in the form of ROM (Read Only Memory) media such as optical disks, magneto-optical disks, or Blue-ray disks. With the increase of the data communication speed, services that allow content servers to transmit image files of game software to user terminal devices over the internet have become popular in recent years.

Game software includes a file group including a startup file, a game program, and the like to execute a game and a file group to be used by an OS (Operating System) of a game device. In recent years, the number of files included in game software is increasing. There is thus a trend toward an increase in scale of a data size.

SUMMARY

Technical Problem

The increase in scale of a data size results in oppression of capacity in an auxiliary storage device that records the game software. There is a game device to which an extended storage can be connected for the purpose of increasing the recording capacity, but operation of game software installed into an extended storage is usually not tested. Hence, operation of game software installed in an extended storage has not been assured. Accordingly, there is a need for a mechanism of enabling stable execution of game software with connection established to an extended storage.

In addition, there is a possibility that connection to an extended storage is suddenly interrupted because an extended storage is connected to a game device via a cable or via radio waves. Accordingly, it is necessary to operate system software that is kept up to data even when connection to an extended storage is interrupted.

Therefore, an object of the present invention is to provide a technology of recording files into a plurality of auxiliary storage devices in a preferable manner.

Solution to Problem

In order to solve the abovementioned problem, an information processing device according to one aspect of the present invention has a function of integrally managing a first recording region in a first auxiliary storage device and a second recording region in a second auxiliary storage device. The information processing device includes a reception section that receives information indicating a type of a file to be recorded, a place information acquisition section that acquires information regarding a recording place corresponding to the received information indicating the type of the file, a metadata processing section that defines metadata regarding a recording place of the file in reference to the acquired information regarding the recording place, and a recording processing section that records the file into the first recording region and/or the second recording region according to the defined metadata.

Another aspect of the present invention is a file recording method for an information processing device that has a function of integrally managing a first recording region in a first auxiliary storage device and a second recording region in a second auxiliary storage device. The file recording method includes a step of receiving information indicating a type of a file to be recorded, a step of acquiring information regarding a recording place corresponding to the received information indicating the type of the file, a step of determining metadata regarding a recording place of the file in reference to the acquired information regarding the recording place, and a step of recording the file into the first recording region and/or the second recording region according to the defined metadata.

It is to be noted that the abovementioned constituent elements can be combined in any manner, and the expressions in the present invention transformed between methods, apparatuses, systems, recording media, computer programs, or the like are also valid as aspects of the present invention.

DESCRIPTION OF EMBODIMENT

Figure 1:
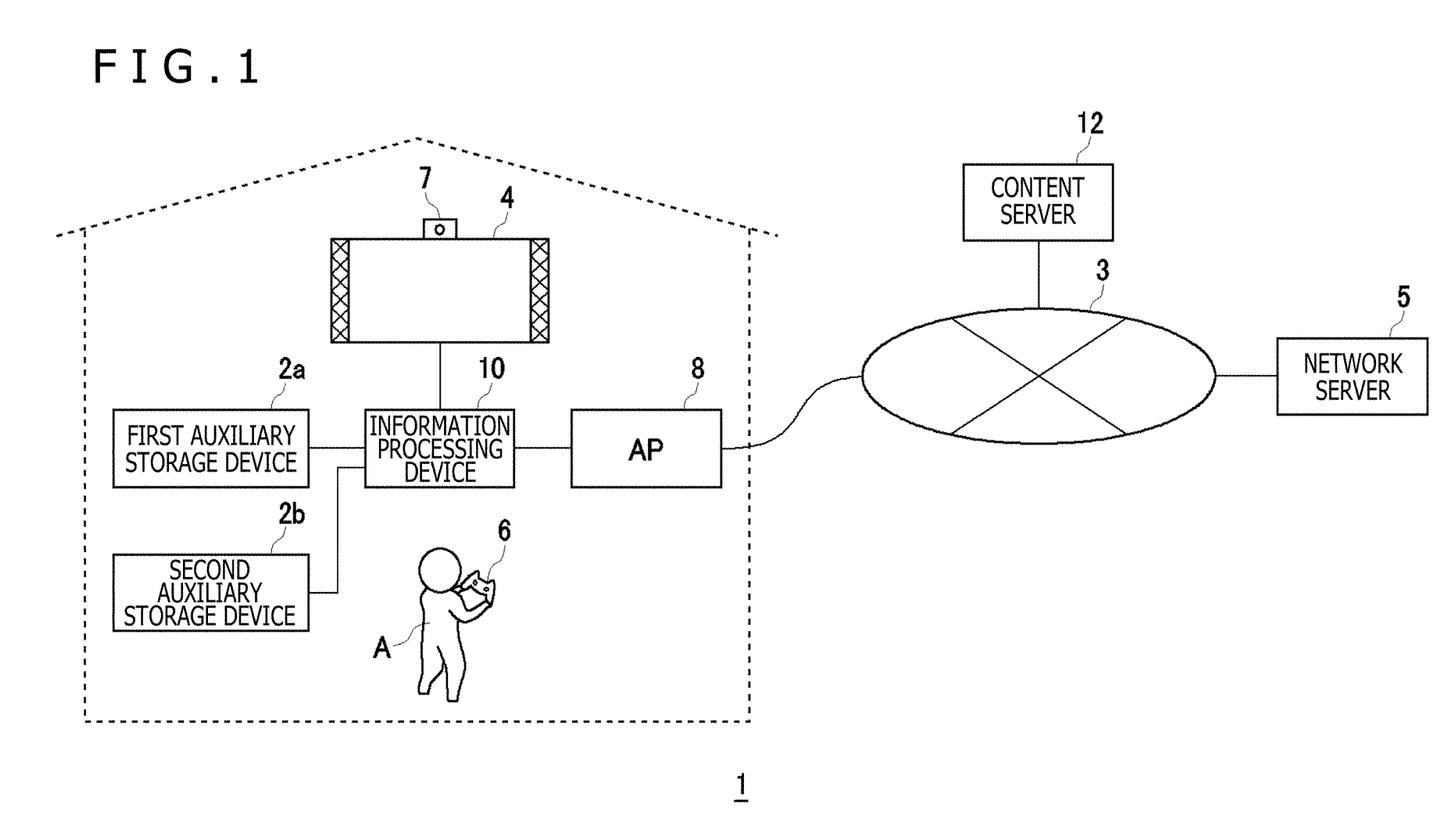
FIG. 1 is a diagram illustrating an information processing system according to an embodiment.

FIG. 1 illustrates an information processing system 1 according to an embodiment of the present invention. The information processing system 1 includes an information processing device 10, a network server 5, and a content server 12 that transmits digital content. An access point (hereinafter, referred to as an "AP") 8 has a wireless access point function and a router function. Through the AP 8, the information processing device 10 is communicably connected to the network server 5 and the content server 12 that are on a network 3. The network 3 may include the Internet or a LAN (Local Area Network), for example.

The network server 5 is maintained and managed by the managing entity of the information processing system 1, and provides a network service to a user of the information processing system 1. The content server 12 holds digital content such as game software (hereinafter, also referred to as a "game file") and video files, and distributes the digital content in response to a request from the user. By signing in the network service, the user is allowed to download the digital content from the content server 12, and to record game data to be saved, etc., in the network server 5.

The information processing device 10 establishes wireless or wired connection to an input device 6 being operated by a user. The input device 6 outputs, to the information processing device 10, operation information that indicates a user operation result. Upon receiving the operation information from the input device 6, the information processing device 10 reflects the operation information in the OS or application processes, and outputs the process result through an output device 4. In this embodiment, the information processing device 10 may be a game device that executes a game program, and the input device 6 may be a device, such as a game controller, that supplies user operation information to the information processing device 10. The information processing device 10 has a function of reproducing a video such as a movie, in addition to the function of executing games.

The output device 4 may be a television including a display for outputting images and a loudspeaker for outputting sounds, or may be a head mounted display. A camera 7 is disposed near the output device 4, and photographs an area around the output device 4. Each of a first auxiliary storage device 2a and a second auxiliary storage device 2b is an HDD (Hard Disk Drive) or an SSD (Solid State Drive) which are large-capacity storage devices. The first auxiliary storage device 2a may be a built-in type storage device incorporated in a casing of the information processing device 10.

In a case where game devices of multiple generations are in circulation, the information processing device 10 according to the embodiment is a game device of the latest generation having high-end hardware to implement a high-speed computation process and high-resolution graphics. In order to provide new game experiences to users, game manufacturers develop game software for sufficiently utilizing the hardware specifications of a game device of the latest generation.

Game software produced by a game manufacturer is installed into the first auxiliary storage device 2a of a developed game machine having target hardware, and operation of the game software is tested. Quality assurance based on operation tests is a prerequisite to sell game software. Hereinafter, game software produced for the latest-generation hardware of the information processing device 10 is referred to as a "first game file." Operation of the first game file that is recorded in the first auxiliary storage device 2a is assured.

In contrast, the second auxiliary storage device 2b is an external storage device that is connected to the information processing device 10 via a cable or via radio waves. The second auxiliary storage device 2b is an extended storage to which the information processing device 10 is connected to increase an available storage capacity. Operation of the first game file that is recorded in an extended storage is not assured. Hence, operation of the first game file that is recorded in the second auxiliary storage device 2b is not assured.

It is to be noted that, in a case where the information processing device 10 executes game software (hereinafter, referred to as a "second game file") for game devices of an older generation, a high-speed computation process, which is required for a first game file, is unnecessary. In this case, the second game file installed in the second auxiliary storage device 2b can be executed without any problem. Also in a case where, for example, a video file which is digital content other than a game is reproduced, the information processing device 10 can reproduce the video file recorded in the second auxiliary storage device 2b without any problem.

In view of the abovementioned circumstances, it is preferable that, in a case where the information processing device 10 executes the first game file, the first game file be recorded in the first auxiliary storage device 2a. In addition, in a case where the information processing device 10 executes, for example, a second game file or a video file, which is digital content other than the first game file, the second game file or the video file may be recorded in the first auxiliary storage device 2a, or may be recorded in the second auxiliary storage device 2b. It is to be noted that the embodiment exemplifies a state in which the information processing device 10 has one built-in first auxiliary storage device 2a, and is connected to one second auxiliary storage device 2b, but the information processing device 10 may have a plurality of the built-in first auxiliary storage devices 2a, and may be connected to a plurality of the second auxiliary storage devices 2b.

Figure 2:
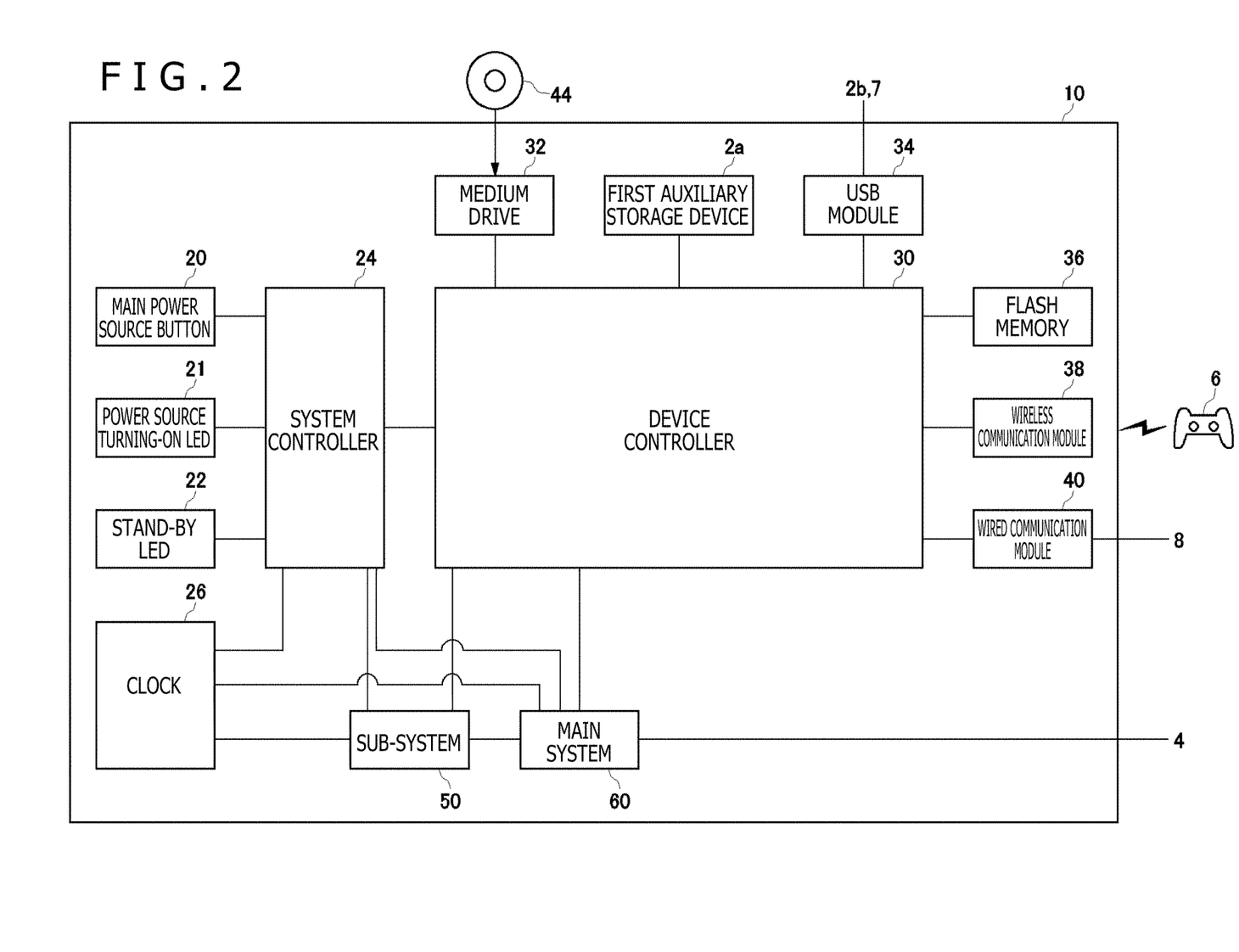
FIG. 2 is a diagram illustrating a hardware configuration of an information processing device.

FIG. 2 illustrates a hardware configuration of the information processing device 10. The information processing device 10 includes a main power source button 20, a power source turning-on LED (Light Emitting Diode) 21, a stand-by LED 22, a system controller 24, a clock 26, a device controller 30, a medium drive 32, the first auxiliary storage device 2a, a USB (Universal Serial Bus) module 34, a flash memory 36, a wireless communication module 38, a wired communication module 40, a sub-system 50, and a main system 60.

The main system 60 includes a main CPU (Central Processing Unit), a memory and a memory controller which are main storage devices, a GPU (Graphics Processing Unit), etc. The GPU is used mainly for computation processing of a game program. These functions may be implemented by a system on a chip, and be formed on a single chip. The main CPU has a function of executing game software recorded in the first auxiliary storage device 2a or the second auxiliary storage device 2b.

The sub-system 50 includes a sub-CPU, a memory and a memory controller which are main storage devices, etc., but does not have a GPU, and thus, does not have a function of executing a game program. The number of circuit gates in the sub-CPU is less than the number of circuit gates in the main CPU. Power consumption attributable to operation of the sub-CPU is smaller than power consumption attributable to operation of the main CPU.

On the main power source button 20, user's operation input is performed. The main power source button 20 is disposed on a front surface of the casing of the information processing device 10, and is operated to turn on/off power supply to the main system 60 of the information processing device 10. The power source turning-on LED 21 is lit when the main power source button 20 is turned on. The stand-by LED 22 is lit when the main power source button 20 is turned off.

The system controller 24 detects depression of the main power source button 20 by the user. When the main power source button 20 is depressed during an off state of the main power source, the system controller 24 acquires the depression operation and regards the operation as a "turning-ON instruction." When the main power source button 20 is depressed during an on state of the main power source, the system controller 24 acquires the depression operation and regards the operation as a "turning-OFF instruction."

The clock 26 is a real-time clock. The clock 26 generates current date-and-time information, and supplies the current date-and-time information to the system controller 24, the sub-system 50, and the main system 60.

The device controller 30 is configured as an LSI (Large-Scale Integrated Circuit) that, like a Southbridge, executes information exchange between devices. As illustrated in the drawing, such devices as the system controller 24, the medium drive 32, the first auxiliary storage device 2a, the USB module 34, the flash memory 36, the wireless communication module 38, the wired communication module 40, the sub-system 50, and the main system 60 are connected to the device controller 30. The device controller 30 absorbs the difference in the electric characteristics and the difference in the data transfer speed among the devices, and controls data transfer timings.

The medium drive 32 is driven with a ROM medium 44 mounted thereon. In the ROM medium 44, application software of a game or the like is recorded. The medium drive 32 is a drive device that reads out a program and data from the ROM medium 44. The ROM medium 44 is a read-only recording medium such as an optical disk, a magneto-optical disk, or a Blue-ray disk.

The USB module 34 is connected to an external device via a USB cable. The USB module 34 may be connected to the second auxiliary storage device 2b and the camera 7 via a USB cable. The flash memory 36 is an auxiliary storage device constituting an inner storage. The wireless communication module 38 performs wireless communication with the input device 6, for example, in accordance with a communication protocol such as the Bluetooth (registered trademark) protocol or the IEEE (Institute of Electrical and Electronics Engineers) 802.11 protocol. Note that the wireless communication module 38 may be adaptive to a digital cellular phone system. The wired communication module 40 performs wired communication with an external device, and is connected to the network 3 via the AP 8.

Figure 3:
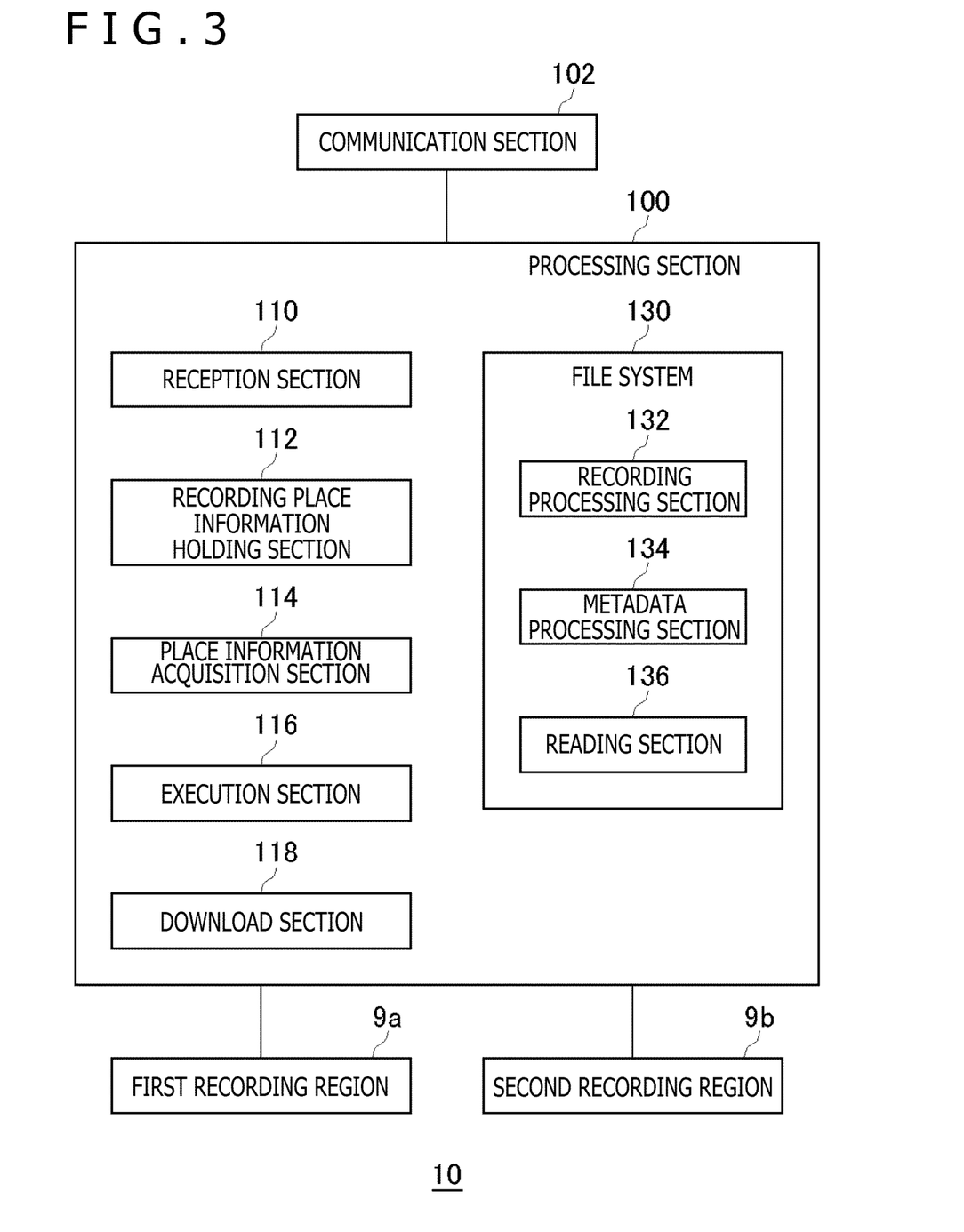
FIG. 3 is a diagram illustrating functional blocks of the information processing device.

FIG. 3 illustrates functional blocks of the information processing device 10. The information processing device 10 includes a processing section 100 and a communication section 102. The processing section 100 includes a reception section 110, a recording place information holding section 112, a place information acquisition section 114, an execution section 116, a download section 118, and a file system 130. The communication section 102 is implemented as a section having both the function of the wireless communication module 38 and the function of the wired communication module 40 which are illustrated in FIG. 2.

In terms of hardware components, the configuration of the processing section 100 is implemented by, for example, a CPU, a memory, a program loaded in the memory, and a storage of any computer. However, functional blocks that are implemented by coordination among such components are illustrated in FIG. 3. Hence, a person skilled in the art shall understand that these functional blocks can be implemented in various forms, that is, by hardware only, by software only, or a combination of the two.

The file system 130 includes a recording processing section 132, a metadata processing section 134, and a reading section 136. The recording processing section 132 includes at least a data reading function and a data writing function for data recording. The file system 130 according to the embodiment has a function of integrally managing a first recording region 9a in the first auxiliary storage device 2a and a second recording region 9b in the second auxiliary storage device 2b.

A case where the first recording region 9a in the first auxiliary storage device 2a and the second recording region 9b in the second auxiliary storage device 2b are not integrated is discussed here. In this case, the first recording region 9a and the second recording region 9b are managed by different file systems. Hence, even if an effort is made to transfer a file recorded in either one of the first recording region 9a and the second recording region 9b to the other recording region, the file must be copied because the file cannot be transferred. Accordingly, the same file is recorded in both the first recording region 9a and the second recording region 9b, whereby efficient utilization of the recording regions is impaired. In addition, regarding a free space in the first recording region 9a and a free space in the second recording region 9b, the free spaces are separately managed by different file systems. Hence, there is a disadvantage that the free spaces in the first and second recording regions cannot be utilized in combination.

As such, in the information processing device 10 according to the embodiment, one file system 130 collectively manages the first recording region 9a in the first auxiliary storage device 2a and the second recording region 9b in the second auxiliary storage device 2b. As a result of the integral management of the recording regions in different auxiliary storage devices 2, the following advantages are brought about.

(1) Files can be transferred between different auxiliary storage devices 2.

When the recording regions in a plurality of auxiliary storage devices 2 are integrated and regarded as a single recording region, files can be transferred therebetween. Thus, a situation in which the plurality of auxiliary storage devices 2 simultaneously have the same file can be prevented.

(2) Even when one file is divisionally recorded in a plurality of auxiliary storage devices 2, the recording places of the file can be expressed by the same directory.

(3) Free spaces in a plurality of auxiliary storage devices 2 can be used in combination.

In order to achieve the above advantages, the file system 130 integrally manages the first recording region 9a and the second recording region 9b.

Meanwhile, the first auxiliary storage device 2a and the second auxiliary storage device 2b according to the embodiment have different characteristics and features. Specifically, regarding the first game file, operation of the first game file installed in the first auxiliary storage device 2a is assured, whereas operation of the first game file installed in the second auxiliary storage device 2b is not. Further, regarding a connection form, the first auxiliary storage device 2a is normally connected to the processing section 100 because the first auxiliary storage device 2a is a built-in type storage device, whereas connection of the second auxiliary storage device 2b to the information processing device 10 may be cancelled because the second auxiliary storage device 2b is an external storage device.

As such, system software of the information processing device 10 manages operation of the file system 130 in such a manner as to record a file of a predetermined type into the first auxiliary storage device 2a, on the precondition that the first recording region 9a in the first auxiliary storage device 2a and the second recording region 9b in the second auxiliary storage device 2b are integrally managed. Accordingly, the place information acquisition section 114 is implemented by an API (Application Programming Interface) function of the system software.

The reception section 110 receives information indicating the type of the file to be recorded. Here, examples of the file include at least a content file such as game software or a video file, a temporary file that is temporarily created in the information processing device 10, and a system file that is downloaded when the system software is to be updated. Specifically, the information may indicate that the file to be recorded is a first game file, a second game file, a video file, a temporary file, or a system file.

The reception section 110 receives an instruction (command) for the file simultaneously with the information indicating the type of the file to be recorded. Examples of the instruction that the reception section 110 explicitly receives from a user include an instruction to install a game file, an instruction to start a game file, and an instruction to terminate execution of a game file. It is to be noted that, when a game file is forcefully terminated, the reception section 110 may receive, from the execution section 116 that has been executing the game file, an instruction to terminate execution of the game file.

The recording place information holding section 112 holds information regarding a file recording place corresponding to the type of the file and/or an instruction for the file.

Figure 4:
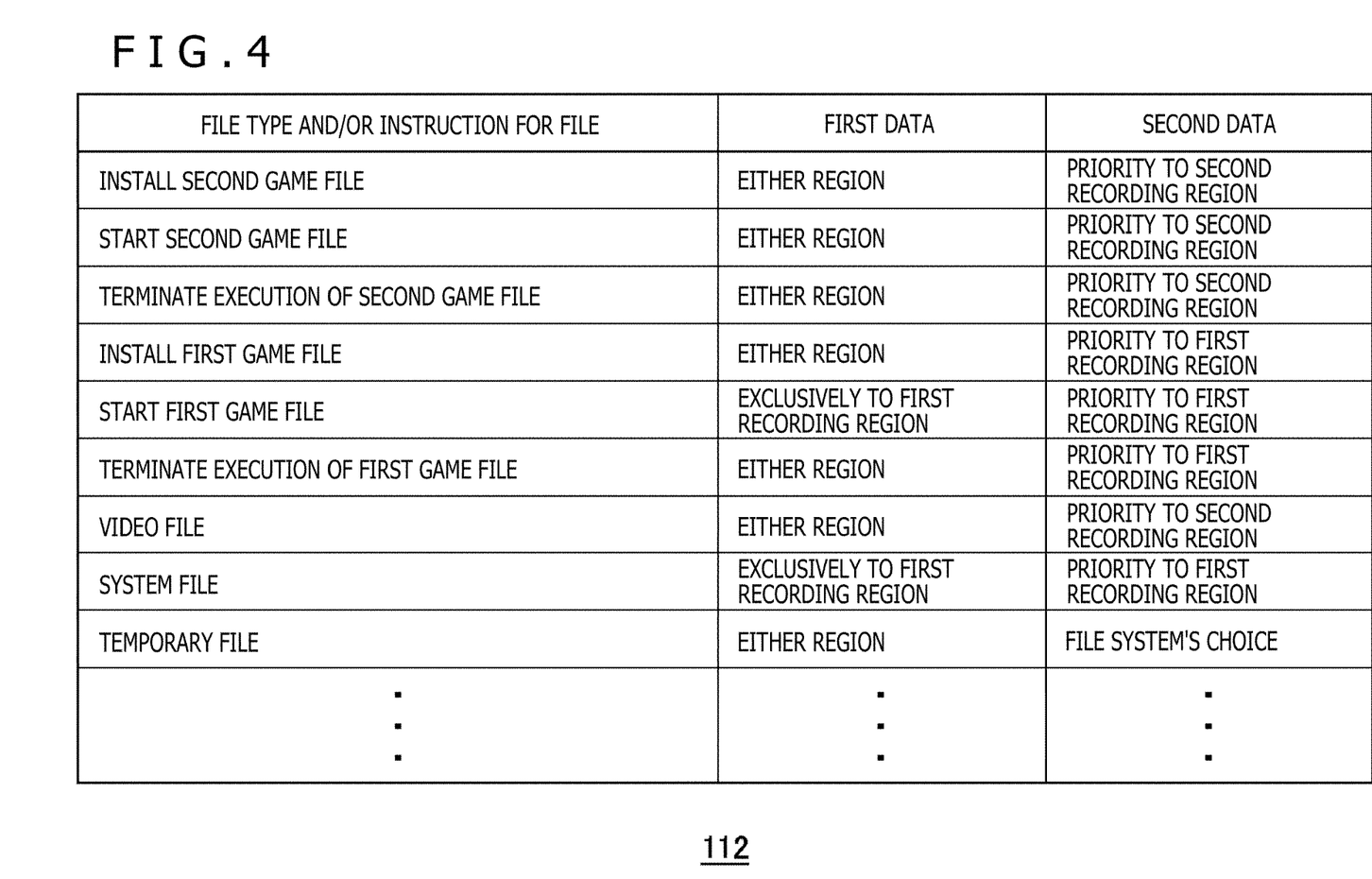
FIG. 4 indicates an example of contents held in a recording place information holding section.

FIG. 4 indicates an example of contents held in the recording place information holding section 112. The recording place information holding section 112 holds at least two types of information that are necessary for the file system 130 to determine the file recording place.

Specifically, the recording place information holding section 112 holds a first data value and a second data value that serve as references for determining the file recording place, in association with the type of the file and/or an instruction for the file. The first data value and the second data value, which will be explained later, are defined as metadata for the file by the metadata processing section 134, and are used by the recording processing section 132 to decide a recording place. It is to be noted that the metadata is recorded in a predetermined allocated region in the first recording region 9a.

<First Data>

The first data value indicates that a file is to be recorded only in the first recording region 9a, or that a file can be recorded in either the first recording region 9a or the second recording region 9b.

A first value "exclusively to first recording region" of first data indicates that the recording processing section 132 must record the file only in the first recording region 9a. Hence, in a case where the first data value which is metadata for the file indicates "exclusively to first recording region," the whole data in the file must be recorded in the first recording region 9a.

For example, during update of the system software, the place information acquisition section 114 reports the first data value ("exclusively to first recording region") that is associated with a system file, to the file system 130, in view of the content held in the recording place information holding section 112. In response to the report, the metadata processing section 134 defines "exclusively to first recording region" as metadata for the system file to be downloaded.

Figure 5:
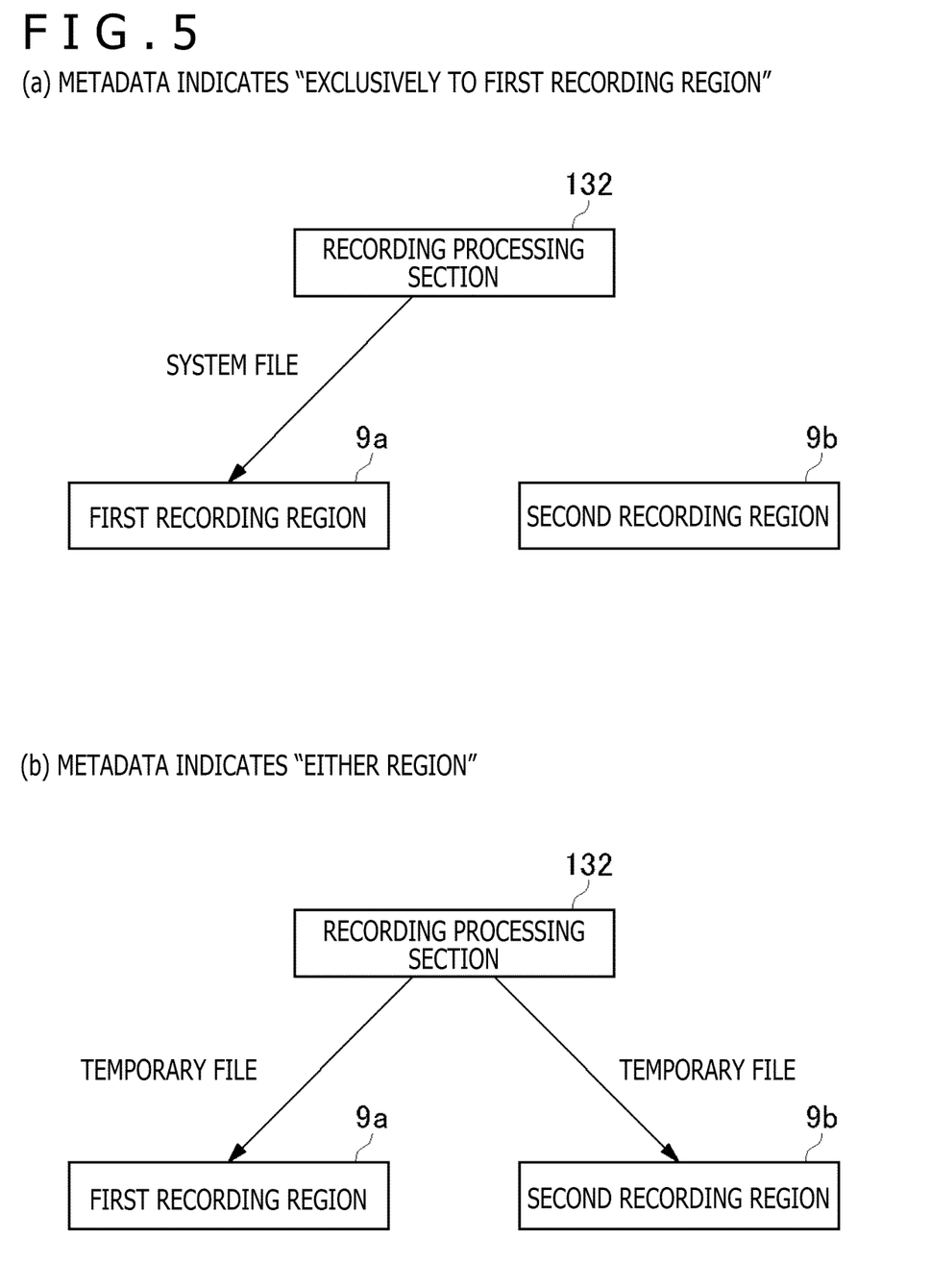
FIG. 5 illustrates a situation in which a recording processing section 132 records files.

In FIG. 5, (a) illustrates a situation in which the recording processing section 132 records a system file. When the download section 118 downloads a system file, the recording processing section 132 records the system file only into the first recording region 9a because the metadata indicates "exclusively to first recording region." Since the first auxiliary storage device 2a is normally connected to the processing section 100, the system software can surely be kept up to date if the system file is recorded in the first recording region 9a.

A second value "either region" of first data indicates that the recording processing section 132 can record a file in either the first recording region 9a or the second recording region 9b. Hence, in a case where the first data value which is metadata for a file indicates "either region," the whole data in the file can be recorded in the first recording region 9a, the whole data in the file can be recorded in the second recording region 9b, or the data in the file can be divisionally recorded in the first recording region 9a and the second recording region 9b.

For example, when a temporary file is created, the place information acquisition section 114 reports the first data value ("either region") associated with the temporary file to the file system 130, in view of the content held in the recording place information holding section 112. In response to the report, the metadata processing section 134 defines "either region" as metadata for the created temporary file.

In FIG. 5, (b) illustrates a situation in which the recording processing section 132 records a temporary file. Since the metadata indicates "either region," the recording processing section 132 records the temporary file into the first recording region 9a and/or the second recording region 9b. It is to be noted that, in a case where metadata indicates "either region," the recording processing section 132 decides either the first recording region 9a or the second recording region 9b, as the recording place, in view of the second data value.

<Second Data>

The second data value indicates that a file is to be recorded first into the first recording region 9a, that a file is to be recorded first into the second recording region 9b, or that the choice of file recording places is left to the recording processing section 132. It is to be noted that the second data value is metadata to be referred to when the corresponding first data value indicates "either region." The second data value is not referred to when the corresponding first data value indicates "exclusively to first recording region." In a case where the first data value indicates "exclusively to first recording region," the recording processing section 132 must record the file into the first recording region 9a, irrespective of the second data value.

A first value "priority to first recording region" of second data indicates that the recording processing section 132 records a file first into the first recording region 9a. Here, recording a file first into the first recording region 9a means that the recording processing section 132 records a file into the first recording region 9a as long as any free space is left in the first recording region 9a. When the capacity in the first recording region 9a becomes full, the recording processing section 132 records the remaining part of the file into the second recording region 9b.

A second value "priority to second recording region" of the second data indicates that the recording processing section 132 records a file first into the second recording region 9b. Here, recording a file first into the second recording region 9b means that the recording processing section 132 records the file into the second recording region 9b as long as any free space is left in the second recording region 9b. When the capacity in the second recording region 9b becomes full, the recording processing section 132 records the remaining part of the file into the first recording region 9a.

A third value "file system's choice" of the second data indicates that the recording processing section 132 decides a file recording place in accordance with a specific recording rule. In the information processing device 10, the recording rule may be defined according to the purpose. For example, if a recording rule for making a free space in the first recording region 9a as large as possible is adopted, a recording process in a manner similar to "priority to second recording region" is performed. Alternatively, a recording rule for making the free space in the first recording region 9a and the free space in the second recording region 9b as equal as possible may be adopted.

In the processing section 100, the place information acquisition section 114 acquires information regarding a file recording place corresponding to information indicating the type of the file to be recorded, in view of the content held in the recording place information holding section 112. It is to be noted that, in a case where the file to be recorded is a first game file, the place information acquisition section 114 acquires information regarding a file recording place corresponding to information indicating the type of the file and an instruction for the file. The place information acquisition section 114 reports the information regarding the file recording place to the file system 130.

In the file system 130, the metadata processing section 134 defines metadata (i.e., the first data value and the second data value) regarding the recording place of the file, in reference to the acquired information regarding the recording place. According to the defined metadata, the recording processing section 132 records the file into the first recording region 9a and/or the second recording region 9b. In the abovementioned manner, the file system 130 according to the embodiment integrates the first recording region 9a and the second recording region 9b and regards them as one recording region, and defines metadata for deciding the recording place according to the predetermined file type or the predetermined file instruction, prior to the recording process. Accordingly, the recording process for a plurality of storage regions having different characteristics can be performed in a preferable manner.

Hereinafter, operation of the processing section 100 in various cases will be explained.

<When Second Game File is Installed>

When a user purchases a second game file at the content server 12, the reception section 110 acquires an instruction to install the second game file. In this case, the reception section 110 receives such indications that the type of the file to be recorded is a "second game file" and that an instruction for the file is "install."

The place information acquisition section 114 acquires information regarding a file recording place corresponding to information (second game file) indicating the type of the file to be recorded and an instruction (installation instruction) for the file, in view of the content held in the recording place information holding section 112. In FIG. 4, "install second game file" is associated with the second value "either region" of the first data and the second value "priority to second recording region" of the second data. The place information acquisition section 114 reports the acquired information regarding the recording place to the file system 130.

In the file system 130, the metadata processing section 134 defines metadata regarding the recording place of the file in reference to the reported information regarding the recording place. In this case, the metadata processing section 134 defines, as metadata for the second game file to be downloaded, the second value "either region" of the first data and the second value "priority to second recording region" of the second data.

After the metadata processing section 134 defines the first data value and the second data value as the metadata, the download section 118 downloads the second game file from the content server 12, and then, the recording processing section 132 installs the second game file according to the defined metadata. When the second game file is installed, the recording processing section 132 records the second game file first into the second recording region 9b because the first data value indicates "either region" and the second data value indicates "priority to second recording region."

<When Second Game File is Started>

When a user selects a second game file from a game startup list, the reception section 110 acquires an instruction to start the second game file. In this case, the reception section 110 receives such indications that the type of the file to be recorded is a "second game file" and that an instruction for the file is "start."

The place information acquisition section 114 acquires information regarding a file recording place corresponding to information (second game file) indicating the type of the file to be recorded and an instruction (startup instruction) for the file, in view of the content held in the recording place information holding section 112. In FIG. 4, "start second game file" is associated with the second value: "either region" of the first data and the second value: "priority to second recording region" of the second data. The place information acquisition section 114 reports the acquired information regarding the recording place to the file system 130.

The metadata processing section 134 defines metadata regarding the recording place of the file in reference to the reported information regarding the recording place. In this case, the metadata processing section 134 defines, as metadata for the second game file to be started, the second value "either region" of the first data and the second value "priority to second recording region" of the second data.

After the metadata processing section 134 defines the first data value and the second data value as the metadata, the recording processing section 132 may change the recording place of the file according to the defined metadata. When the second game file is started, if a part of the second game file is recorded in the first recording region 9a and a free space is left in the second recording region 9b, the recording processing section 132 transfers the second game file recorded in the first recording region 9a to the second recording region 9b because the first data value indicates "either region" and the second data value indicates "priority to second recording region." Thereafter, the reading section 136 reads out a startup file from the second recording region 9b, and the execution section 116 starts the second game file.

<When First Game File is Installed>

When a user purchases a first game file at the content server 12, the reception section 110 acquires an instruction to install the first game file. In this case, the reception section 110 receives such indications that the type of the file to be recorded is a "first game file" and that an instruction for the file is "install."

The place information acquisition section 114 acquires information regarding a file recording place corresponding to information (first game file) indicating the type of the file to be recorded and an instruction (installation instruction) for the file, in view of the content held in the recording place information holding section 112. In FIG. 4, "install first game file" is associated with the second value "either region" of the first data and the first value "priority to first recording region" of the second data. The place information acquisition section 114 reports the acquired information regarding the recording place to the file system 130.

In the file system 130, the metadata processing section 134 defines metadata regarding the recording place of the file in reference to the reported information regarding the recording place. In this case, the metadata processing section 134 defines, as metadata for the first game file to be downloaded, the second value "either region" of the first data and the first value "priority to first recording region" of the second data.

After the metadata processing section 134 defines the first data value and the second data value as the metadata, the download section 118 downloads the first game file from the content server 12, and the recording processing section 132 installs the first game file according to the defined metadata.

When the first game file is installed, the recording processing section 132 records the first game file first into the first recording region 9a because the first data value indicates "either region" and the second data value indicates "priority to first recording region." Accordingly, if a free space in the first recording region 9a is insufficient, the recording processing section 132 records at least a part of the first game file into the second recording region 9b.

<When First Game File is Started>

When a user selects a first game file from a game startup list, the reception section 110 acquires an instruction to start a first game file. In this case, the reception section 110 receives such indications that the type of the file to be recorded is a "first game file" and that an instruction for the file is "start."

The place information acquisition section 114 acquires information regarding a file recording place corresponding to information (first game file) indicating the type of the file to be recorded and an instruction (startup instruction) for the file, in view of the content held in the recording place information holding section 112. In FIG. 4, "start first game file" is associated with the first value "exclusively to first recording region" of the first data and the first value "priority to first recording region" of the second data. The place information acquisition section 114 reports the acquired information regarding the recording place to the file system 130.

The metadata processing section 134 defines metadata regarding the recording place of the file in reference to the reported information regarding the recording place. In this case, the metadata processing section 134 defines, as metadata for the first game file to be started, the first value "exclusively to first recording region" of the first data and the first value "priority to first recording region" of the second data.

After the metadata processing section 134 defines the first data value and the second data value as the metadata, the recording processing section 132 changes the recording place of the file according to the defined metadata. If a part of the first game file is recorded in the second recording region 9b when the first game file is started, the recording processing section 132 transfers the first game file recorded in the second recording region 9b to the first recording region 9a because the first data value indicates "exclusively to first recording region." Thereafter, the reading section 136 reads out a startup file from the first recording region 9a, and the execution section 116 starts the first game file.

As described so far, the metadata for the first game file indicates the second value "either region" of the first data when the first game file is installed, but is changed to the first value "exclusively to first recording region" of the first data when the first game file is started. In a case where the metadata is changed in such a manner, if there is a file recorded in the second recording region 9b, the recording processing section 132 transfers the file to the first recording region 9a. Accordingly, the first game file can be started while operation thereof is assured.

<When Execution of First Game File is Terminated>

When a user terminates playing of a first game, the reception section 110 acquires an instruction to terminate execution of a first game file. In this case, the reception section 110 receives such indications that the type of the file to be recorded is a "first game file" and that an instruction for the file is "terminate execution." Then, the execution section 116 terminates execution of the first game file.

The place information acquisition section 114 acquires information regarding a file recording place corresponding to information (first game file) indicating the type of the file to be recorded and an instruction (execution termination instruction) for the file, in view of the content held in the recording place information holding section 112. In FIG. 4, "terminate execution of first game file" is associated with the second value "either region" of the first data and the first value "priority to first recording region" of the second data. The place information acquisition section 114 reports the acquired information regarding the recording place to the file system 130.

The metadata processing section 134 defines metadata regarding the recording place of the file in reference to the reported information regarding the recording place. In this case, the metadata processing section 134 defines, as metadata for the first game file the execution of which is to be terminated, the second value "either region" of the first data and the first value "priority to first recording region" of the second data. In this case, since the whole of the first game file is recorded in the first recording region 9a, the recording processing section 132 does not change the recording place of the file. It is to be noted that, since the metadata for the first game file the execution of which has been terminated is changed to "either region," the first game file may be transferred to the second recording region 9b, if needed.

Figure 6:
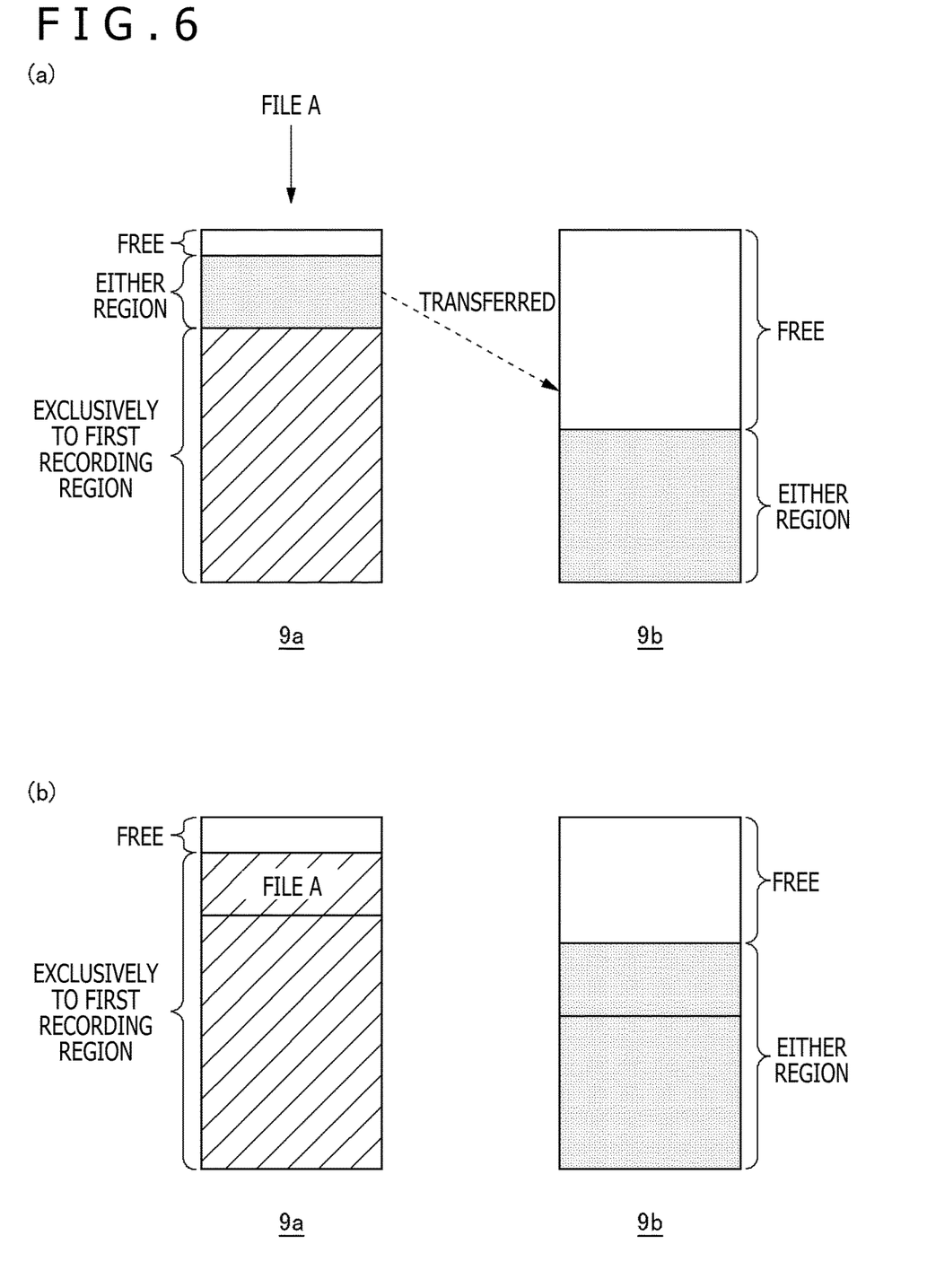
FIG. 6 illustrates an example of a recording state in a first recording region and a recording state in a second recording region.

In FIG. 6, (a) illustrates an example of a recording state in the first recording region 9a and a recording state in the second recording region 9b. In the first recording region 9a, a group of files for all of which "exclusively to first recording region" is defined as metadata and a group of files for all of which "either region" is defined as metadata are recorded. This example illustrates a situation in which the recording processing section 132 is to record a new file A for which "exclusively to first recording region" is defined as metadata, into the first recording region 9a, but a free space in the first recording region 9a is insufficient.

In FIG. 6, (b) illustrates an example in which a file recorded in the first recording region 9a is transferred to the second recording region 9b. When the recording processing section 132 is to record a new file A into the first recording region 9a but a free space in the first recording region 9a is insufficient, the recording processing section 132 transfers at least a part of the file which is recorded in the first recording region 9a and for which "either region" is defined as the first data value, to the second recording region 9b.

Accordingly, the free space in the first recording region 9a is increased, so that the new file A can be recorded into the first recording region 9a.

The present invention has been explained in reference to the embodiment. The embodiment exemplifies the present invention, but a person skilled in the art can understand that a variety of modifications can be made to a combination of the components and the processes in the embodiment, and further, that the modifications are also within the scope of the present invention.

INDUSTRIAL APPLICABILITY

The present invention can be used in the technical field of recording files in auxiliary storage devices.

REFERENCE SIGNS LIST

1: Information processing system
2a: First auxiliary storage device
2b: Second auxiliary storage device
9a: First recording region
9b: Second recording region 10: Information processing device
100: Processing section
102: Communication section
110: Reception section
112: Recording place information holding section
114: Place information acquisition section
116: Execution section
118: Download section
130: File system
132: Recording processing section
134: Metadata processing section
136: Reading section

The invention claimed is:

1. An information processing device having a function of integrally managing a first recording region in a first auxiliary storage device and a second recording region in a second auxiliary storage device, the information processing device comprising:
circuitry configured to
receive information indicating a type of a file to be recorded;
acquire information regarding a recording place corresponding to the received information indicating the type of the file;
define metadata regarding a recording place of the file in reference to the acquired information regarding the recording place, wherein the metadata includes a first data value that indicates that the file is to be recorded only into the first recording region or indicates that the file is allowed to be recorded in either the first recording region or the second recording region; and
record the file into the first recording region and/or the second recording region according to the defined metadata.

2. The information processing device of claim 1, wherein the circuitry is configured to:
receive an instruction for the file; and
acquire information regarding a recording place corresponding to the received instruction for the file.

3. The information processing device of claim 1, wherein the circuitry is configured to define, as the metadata, a second data value that indicates that the file is to be recorded first into the first recording region or indicates that the file is to be recorded first into the second recording region.

4. The information processing device of claim 3, wherein the second data value indicates that the file is to be recorded first into the first recording region, indicates that the file is to be recorded first into the second recording region, or indicates that a choice of recording places of the file is left to the circuitry.

5. The information processing device of claim 3, wherein, in a case where the first data value indicates that the file is allowed to be recorded in either the first recording region or the second recording region, the circuitry is configured to decide a recording place of the file in view of the second data value.

6. The information processing device of claim 1, wherein, in a case where a free space in the first recording region is insufficient to record a new file into the first recording region, the circuitry is configured to transfer, to the second recording region, at least a part of a file that has been recorded in the first recording region and for which the first data value that indicates that the file is allowed to be recorded in either the first recording region or the second recording region.

7. The information processing device of claim 1, wherein, in a case where the metadata is changed from the first data value that indicates that the file is allowed to be recorded in either the first recording region or the second recording region to the first data value that indicates that the file is to be recorded only into the first recording region, the circuitry is configured to transfer the file recorded in the second recording region to the first recording region.

8. The information processing device of claim 1, wherein the circuitry includes a communication interface configured to receive the information indicating the type of file to be recorded.

9. The information processing device of claim 1, wherein the circuitry includes a processor configured to define the metadata and control recording the file into the first recording region and/or the second recording region according to the defined metadata.

10. The information processing device of claim 1, wherein
the information processing device is a gaming console that further comprises the first auxiliary storage device.

11. The information processing device of claim 10, further comprising:
a second communication interface configured to be detachably connected to the second auxiliary storage device.

12. The information processing device of claim 11, wherein
the circuitry is configured to execute a game by executing one or more files stored in the first auxiliary storage device and the second auxiliary storage device.

13. A file recording method for an info ration processing device having a function of integrally managing a first recording region in a first auxiliary storage device and a second recording region in a second auxiliary storage device, the file recording method comprising:
receiving information indicating a type of a file to be recorded;
acquiring information regarding a recording place corresponding to the received information indicating the type of the file;
defining metadata regarding a recording place of the file in reference to the acquired information regarding the recording place, wherein the metadata includes a first data value that indicates that the file is to be recorded only into the first recording region or indicates that the file is allowed to be recorded in either the first recording region or the second recording region; and
recording the file into the first recording region and/or the second recording region according to the defined metadata.

14. The method of claim 13, further comprising:
receiving an instruction for the file; and
acquiring information regarding a recording place corresponding to the received instruction for the file.

15. The method of claim 13, further comprising:
defining, as the metadata, a second data value that indicates that the file is to be recorded first into the first recording region or indicates that the file is to be recorded first into the second recording region.

16. The method of claim 15, wherein
the second data value indicates that the file is to be recorded first into the first recording region, indicates that the file is to be recorded first into the second recording region, or indicates that a choice of recording places of the file is left to the information processing device.

17. The method of claim 15, wherein
in a case where the first data value indicates that the file is allowed to be recorded in either the first recording region or the second recording region, the method includes deciding a recording place of the file in view of the second data value.

18. The method of claim 13, wherein
in a case where a free space in the first recording region is insufficient to record a new file into the first recording region, the method includes transferring, to the second recording region, at least a part of a file that has been recorded in the first recording region and for which the first data value that indicates that the file is allowed to be recorded in either the first recording region or the second recording region.

19. The method of claim 13, wherein
in a case where the metadata is changed from the first data value that indicates that the file is allowed to be recorded in either the first recording region or the second recording region to the first data value that indicates that the file is to be recorded only into the first recording region, the method includes transferring the file recorded in the second recording region to the first recording region.

20. One or more non-transitory computer readable media including computer LEA]] program code, which when executed by circuitry, causes the circuitry to manage a first recording region in a first auxiliary storage device and a second recording region in a second auxiliary storage device, the computer program code, when executed, causes the circuitry to:
information indicating a type of a file to be recorded;
acquire information regarding a recording place corresponding to received information indicating a type of file to be recorded;
define metadata regarding a recording place of the file in reference to the acquired information regarding the recording place, wherein the metadata includes a first data value that indicates that the file is to be recorded only into the first recording region or indicates that the file is allowed to be recorded in either the first recording region or the second recording region; and
record the file into the first recording region and/or the second recording region according to the defined metadata.

\* \* \* \* \*